United States Patent [19]
Province

[11] 3,868,773
[45] Mar. 4, 1975

[54] BEAD REMOVAL TOOL
[75] Inventor: William F. Province, Bartlesville, Okla.
[73] Assignee: Emerson Electric Company, St. Louis, Mo.
[22] Filed: Dec. 17, 1973
[21] Appl. No.: 425,156

[52] U.S. Cl.............. 30/130, 30/301, 15/104.05, 83/914
[51] Int. Cl........................ B23d 9/00, B29c 17/10
[58] Field of Search ............ 30/130, 172, 299, 301, 30/316; 15/104.05; 83/914

[56] References Cited
UNITED STATES PATENTS
| | | | |
|---|---|---|---|
| 2,882,022 | 4/1959 | Greathouse | 15/104.05 X |
| 3,108,374 | 10/1963 | Bowman | 30/130 |
| 3,446,666 | 5/1969 | Bodine | 15/104.05 X |

Primary Examiner—Al Lawrence Smith
Assistant Examiner—J. C. Peters
Attorney, Agent, or Firm—Head & Johnson

[57] ABSTRACT

This abstract describes a bead removal tool for removing the inner bead formed in joining plastic pipe. The tool comprises an axial cylindrical hub carrying a plurality of curved blades adapted to fit adjacent the inner surface of the pipe. The blades are rounded or tapered on their front ends and are sharpened to have a sharp cutting edge along the outer surface of the blades in contact with the wall. Each of the blades fits in contiguous fashion around the wall with each of the other blades. All blades are mounted by spring means from the hub, so that they are constantly pressed outwardly in contact with the inner surface of the pipe. Means are provided to move the hub forward, so that when a bead is reached it will be sheared off by the sharp edges of the plurality of blades.

7 Claims, 4 Drawing Figures

PATENTED MAR 4 1975 3,868,773

BEAD REMOVAL TOOL

BACKGROUND OF THE INVENTION

This invention lies in the field of plastic pipe structures. More particularly, it is concerned with the removal of the bead formed on the inner surface of a plastic pipe system in which the sections of pipe are joined by heating the opposed ends until the plastic softens and then pressing them together so that a strong joint is provided.

In conventional pipe structures, where metal pipes are welded together the methods of removing the bead is by grinding it away by means of a grinding wheel, which is rotatable about the axis of the pipe. No other satisfactory method of removing the bead has been developed, even for plastic pipes.

SUMMARY OF THE INVENTION

It is a primary object of this invention to provide a bead removal tool which is simple in construction and easy to use for the removal of the inner beads formed by the thermal welding of plastic pipe.

This and other objects are realized and the limitations of the prior art are overcome in this invention by the use of a tool comprising a hub which can be forced along the axis of a plastic pipe system. A plurality of curved blades are mounted by spring means from the hub so as to press outwardly against the inner surface of the pipe. The plurality of blades are arranged in substantially contiguous edge contact and form substantially a cylindrical wall contiguous to the interior surface of the pipe. The blades are shaped to provide a suitable cutting edge so that as the tool is moved along the axis each of the blades will contact and shear off a portion of the beads, so that as the tool moves past the joint the complete bead will be removed.

BRIEF DESCRIPTION OF THE DRAWINGS

These and other objects and advantages of this invention and a better understanding of the principles and details thereof will be evident from the following description taken in conjunction with the appended drawings in which.

DESCRIPTION OF THE PREFERRED EMBODIMENT

Figure 1:
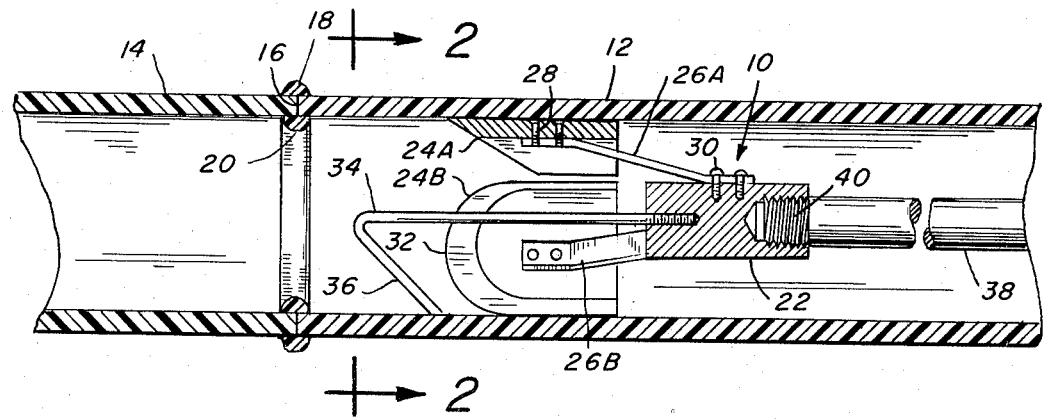
FIGS. 1 and 2 show in cross section a side view and a corresponding end view of the tool as used in a pipe system.
Figure 2:
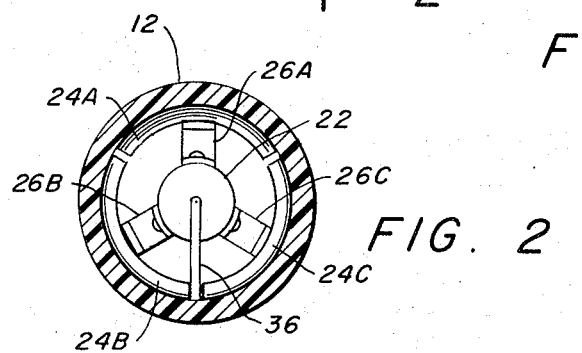

Referring now to the drawings there is shown in FIGS. 1 and 2, two views in section of one embodiment of this invention, indicated generally by the numeral 10. It is used for removal of the bead formed on the inside of a joint between two pieces of plastic pipe after they are joined by being softened on the opposed ends and pressed together so as to weld the two pipes together.

The tool comprises a hub 22 which is positioned along the axis of the pipe. The hub supports a plurality of blades each of which is curved in a partial cylindrical form to fit the inner surface of the pipe. The ends of the blades are shaped either in a rounded or a tapered form and sharpened, so as to have a sharp cutting edge along the outer surface of the blade, where it is in contact with the pipe. The blades are of such angular dimensions that the plurality of blades will fit substantially in contiguous position around the inner surface of the pipe. Each of the blades is supported by spring means from the hub so as to be pressed out in contact with the wall.

The blades 24A, 24B, etc., may be attached to the spring arm means 26A, 26B, etc. by means of screws 28 and 30 for example or by welding, etc. Means to force the tool along the pipe are provided, such as the long cylindrical rod 38 of FIG. 1 which is attached to the hub 23 by means of threads 40, or other suitable means. Thus, after the last section of pipe 12 has been attached by thermal welding to the previous section of pipe 14, the joint is formed at 16 with corresponding beads 18 on the outer surface and 20 on the inner surface. The tool is inserted into the section 12 from the right end and pushed along the pipe by means of the rod 38 until the blades contact and shear off the inner bead 20.

Figure 3:
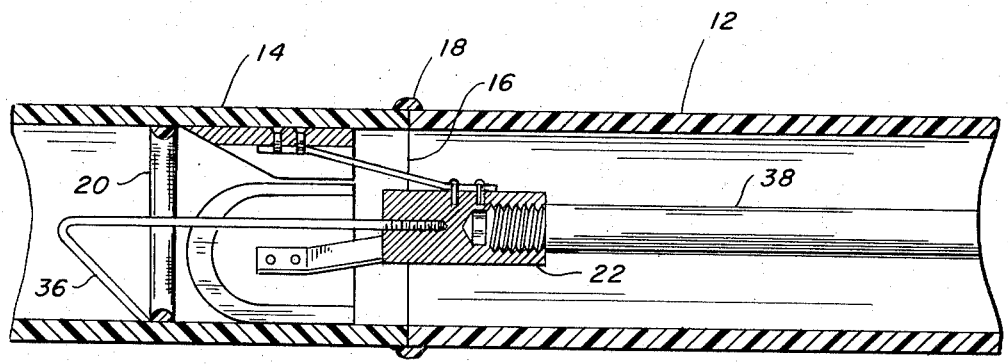
FIG. 3 is a view similar to FIG. 1 showing the position of the tool after a bead has been removed.

A spring rod means 34 is attached to the front end of the hub and has an end portion 36 which is pressed against the inner wall of the pipe. This portion 36 extends out in front of the blades so that when the hub is pushed forward the blades will shear off the inner ring 20 as shown in FIG. 3. Then when the tool 10 is withdrawn the spring arm 36 will catch the removed bead 20 and carry it back with the tool so that it can be disposed of.

Figure 4:
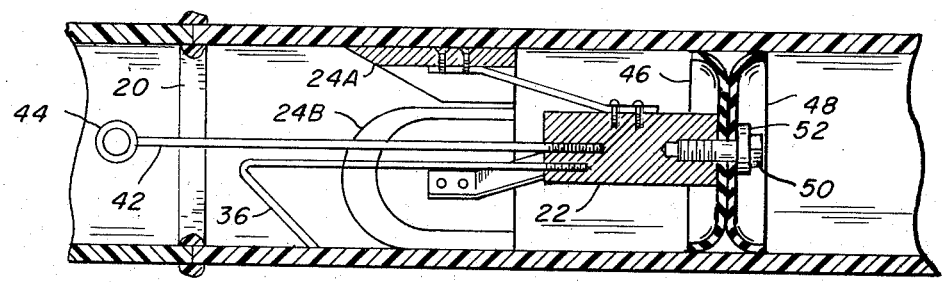
FIG. 4 illustrates another embodiment of the tool in which it is propelled along the axis of the pipe either by fluid pressure or by means of a flexible tension member attached to the front end of the tool.

In FIG. 4 is shown two alternate ways of driving or forcing the tool forward through the pipe. One is to use a rubber cup device such as 46 and/or 48, attached to the hub and held thereto by means of screw 50 and washer 52. Thus, when fluid pressure is applied to the back surface of the cup 48, the edge of the cup will be sealed against the inner surface of the pipe and the fluid pressure will cause the tool to move to the left and remove the bead 20. A second cup 46 positioned in the reverse direction can be used to have the tool withdrawn from the pipe, that is, moved to the right by fluid pressure ahead of the tool.

There is also shown in FIG. 4 a long eye bolt 42 having an eye 44 to which a flexible tension member (not shown) can be attached. Thus the tool can be pulled through the pipe to the left by the tension member.

The blades 24A, 24B, 24C, etc. can be of any suitable material that can be sharpened to a sharp cutting edge and which would be suitable for the purpose of cutting off the bead.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A bead removal tool for removing the inner bead formed while joining lengths of plastic pipe by heating the opposed ends and pressing them together, comprising:

a. an axial hub;
b. A plurality of blades, each formed as portions of a cylindrical wall to approximately fit the interior surface of said pipe, the leading edges of said blades being shaped and sharpened along the outer edge, said plurality of blades positioned in substantially contiguous relation around the inner surface of said pipe;
c. a plurality of spring means, one for each said blade, extending from said hub individually and resiliently outwardly supporting said blades, in contact with the inside surface of said pipe; and
d. means to force said hub along the axis of said pipe, whereby when the sharpened edges of said blades contact an inner bead, said bead will be sheared off by said plurality of blades.

2. The bead removal tool as in claim 1 in which said means to force said hub along said axis comprises long axial rod means attached to said hub.

3. The bead removal tool as in claim 1 in which said means to force said hub along said axis comprises eye bolt means and flexible tension means attached to the front end of said hub.

4. The bead removal tool as in claim 1 in which said means to force said hub along said axis comprises flexible cup means attached to said hub and pressing on the inner surface of said pipe, whereby fluid pressure behind said cup will push said tool along said pipe.

5. The bead removal tool as in claim 4 including a second cup facing to the front, whereby fluid pressure can be used to move said tool forward and backward.

6. The bead removal tool as in claim 1 including spring hook means attached to said hub and extending to the front of said blades, said hook pressing against the wall of said pipe, whereby as said tool is withdrawn said hook will carry with it the beads cut off by said tool.

7. A bead removal tool as in claim 1 wherein said plurality of spring means includes:
a plurality of spring arms, one for each of said blades, each arm having an inner end and an outer end, the inner end of each said spring arm being affixed to said hub, the outer end of each said spring arm being affixed to a said blade, whereby each said blade is independently resiliently supported outwardly from said hub and in contact with said pipe.

* * * * *